C. MESENBRINK.
LOADING AND UNLOADING DEVICE.
APPLICATION FILED JUNE 13, 1916.
1,281,190.
Patented Oct. 8, 1918.
3 SHEETS—SHEET 2.
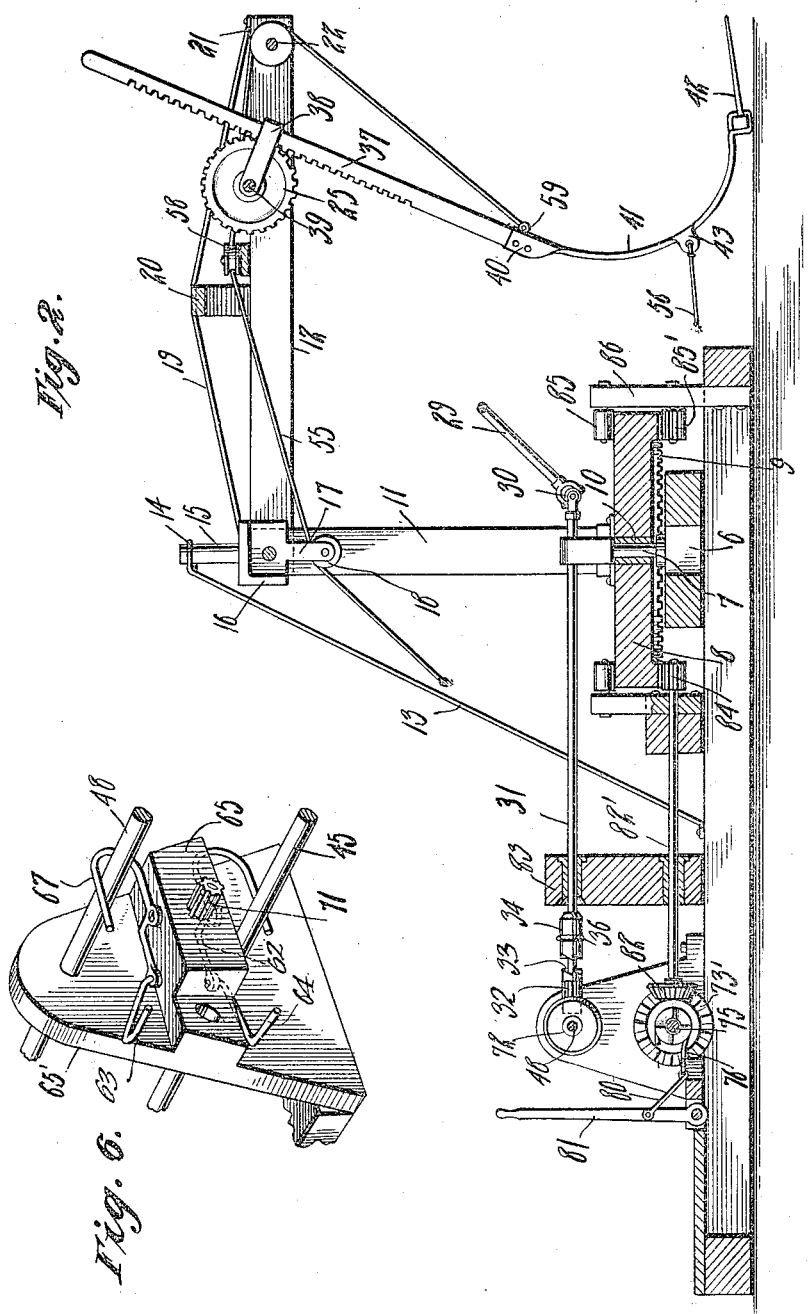
INVENTOR
Charles Mesenbrink,
BY
ATTORNEY
WITNESSES

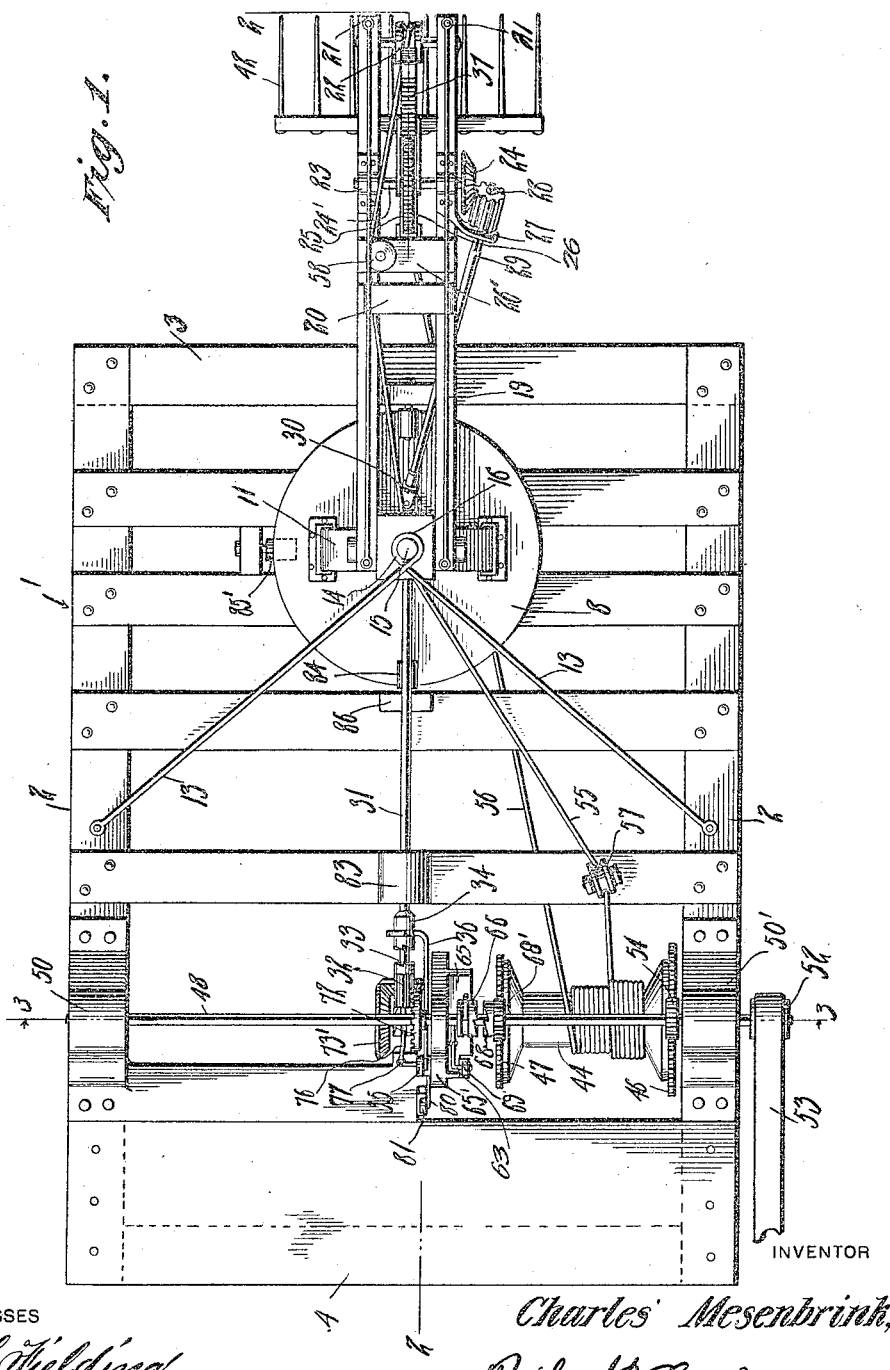

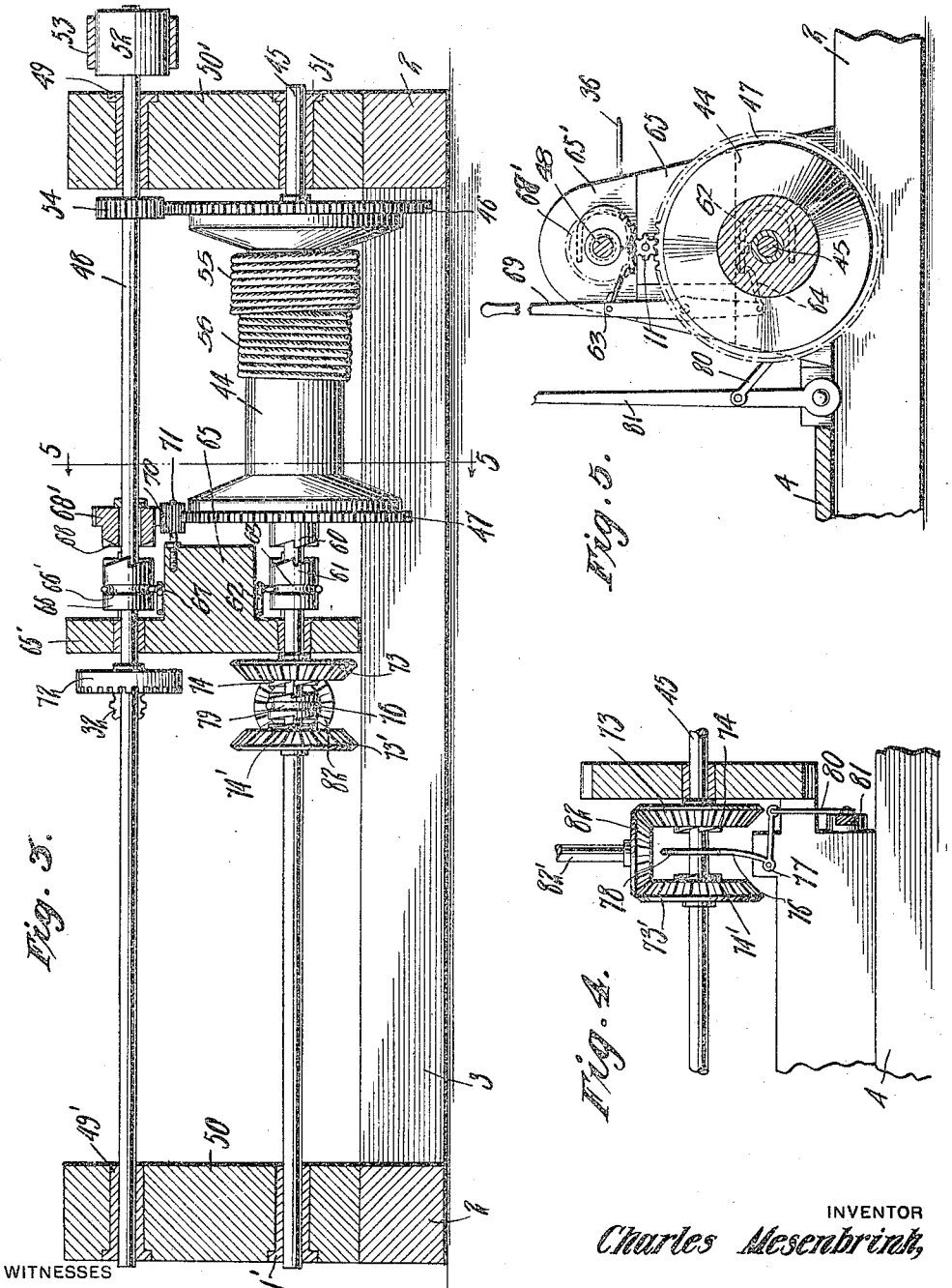

UNITED STATES PATENT OFFICE.

CHARLES MESENBRINK, OF HANCOCK, MINNESOTA.

LOADING AND UNLOADING DEVICE.

1,281,190.  Specification of Letters Patent.  Patented Oct. 8, 1918.

Application filed June 13, 1916. Serial No. 103,513.

*To all whom it may concern:*

Be it known that I, CHARLES MESENBRINK, a citizen of the United States, residing at Hancock, in the county of Stevens and State of Minnesota, have invented certain new and useful Improvements in Loading and Unloading Devices, of which the following is a specification.

This invention relates to loading and unloading devices, and more particularly, to an improved construction whereby practical means are provided for governing the operation of the device.

The primary object of the invention is to provide a rotary crane, the movement of which may be so controlled as to permit the same to be rotated in the desired direction and to provide means whereby the same may be instantaneously stopped by the operator.

Another object of the invention resides in providing a crane with a load handling member which may be elevated or lowered in order that the load may be brought to proper position for discharge; further, supplying the load handling member with suitable rigging whereby the same may be moved forwardly and rearwardly so as to release the load and permit the same to be deposited at the proper position.

It is also contemplated by the invention to provide the device with a main driving shaft, and to position upon the shaft, various clutches adapted to be engaged in order that certain gearing arranged upon the driving shaft may be connected, thus providing means whereby the various parts above described, may be operated independently of each other, or if so desired, in unison.

In devices heretofore prevalent in the art, considerable difficulty has been experienced in providing practical means whereby the crane together with its various constituent elements might be controlled in a manner, such as to permit the operator to efficiently control every operation of the construction, and, to regulate or control the said elements so as to be independently operable.

Among the advantages accruing from my invention may be mentioned the simple construction of the device, the convenient manner in which the device may be operated, the ability of the operator to control each and every operation of the construction so that the load may be readily handled, and, the particular construction of the loading and unloading means, whereby a forward or reverse movement thereof, may be attained.

The annexed drawings and the following description set forth in detail, certain mechanism embodying the invention, such disclosed means, constituting however, but one of the various mechanical forms in which the principle of the invention may be used.

In said annexed drawings:—

Fig. 1 is a top plan;

Fig. 2 is a longitudinal section taken on the line 2—2 of Fig. 1;

Fig. 3 is a transverse section in section taken on line 3—3 of Fig. 1;

Fig. 4 is a detail of the gearing for operating the crane;

Fig. 5 is a section taken on the line 5—5 of Fig. 3; and

Fig. 6 is a detail perspective view of the clutch operating mechanism and gearing whereby the crane is operated and controlled.

Referring now to the drawings, wherein like reference numerals designate corresponding parts throughout the several views, I provide a frame, provided with spaced parallel side arms 2, which are connected by transversely arranged bars 3, which have arranged thereupon adjacent one end, a platform 4, while 6 represents a block or other suitable support whereby the cylindrical stud 7 may be held. Arranged upon the stud 7 and adapted for rotation thereabout, is a disk 8, the lower face of which is provided with circumferentially disposed gear teeth 9, while, in order to provide suitable bearings whereby the rotation of the disk 8 may be facilitated, I position within a suitable opening arranged concentrically of said disk, a sleeve or bushing 10. Supported upon the upper face of the disk 8 substantially in the center thereof and secured thereto, are vertically disposed supporting standards 11, which have pivotally secured thereto, laterally extending arms 12. In order to provide suitable bracing means whereby the standards 11 may be rigidly held in their upright position, I provide brace members 13, which are bent upon themselves as at 14 to constitute a looped portion for engagement with the cylindrical lug 15 as carried by the supporting block 16, this block being in turn, rigidly carried between the standards 11 adjacent the top thereof since the block has inverted L-shaped flanges to receive the upper ends of the standards and further provided with depending arms 17 which have journaled therein a pulley 18. The laterally extending arms 12 are held in position by truss bars 19 which are fastened to the base 16 above mentioned, while the remaining ends extend over a bridging element 20 and are secured to the forward ends of the lateral arms 12 as at 21. Mounted within the forward ends of the arms 12 is a pulley 22, the purpose of which shall be subsequently described, while likewise mounted between the arm 12 at a suitable distance beyond the ends thereof as at 23, is a beveled gear 24 having a shaft 24' upon which, is fixedly mounted a second gear or cog wheel 25, one side of which passes through guide members 26 arranged upon the cross piece 26'. One of the bearings 23 is provided with an angularly extending arm 27 adapted to receive, through a suitable opening therein, an elongated gear 28, this gear in turn being mounted upon a shaft 29, the lower end of which shaft is universally joined as at 30, to a longitudinally extending shaft 31, having arranged at its outer end, an elongated gear 32, the outer face of this gear being serrated as at 33, and adapted for engagement with a slidable clutch member 34, which is operated through the medium of a lever 35 connected therewith, by a link member 36, one end of the link having connected thereto the said slidable clutch 34. Arranged adjacent the gear 25 and enmeshed therewith, is a rack bar 37, the rack bar being normally held in mesh with the gear 25 by means of a yoke 38, the same being loosely supported to the shaft 24', as at 39, and having secured at its lower end, at 40, a load handling member 41, which is provided with a series of tines 42, suitably supported by the member 41, while arranged as at 43, are apertured ears, adapted to receive the rope from the operating rigging therefor, the arrangement of which shall be hereinafter described. It will be noted, that the structure thus far described, constitutes the rotary crane, together with its respective gearing, whereby the same may be rotated, also, the load handling arrangement *per se*, which may be elevated or lowered by means of the driving gear 28, which gear is enmeshed with the beveled gear 24, thus, when the shafts 29 and 31 are rotated, the necessary driving power is supplied to gear 25.

Referring now to the rigging of the device and the operating means therefor, I provide a winding drum 44, which is arranged upon a transversely disposed driven shaft 45, and so mounted as to be independent thereof. The winding drum 44 has arranged adjacent either side of the same, gear wheels 46 and 47. The gear 46 is mounted independently of the winding drum 44 while the gear 47 is affixed thereto. It may be also stated, that the gear 46 is fixedly mounted upon the transverse winding drum supporting shaft 44 and that the gear 47 is loosely mounted thereon. Arranged above the transversely disposed shaft and preferably in vertical alinement therewith, is a second transversely disposed shaft 48, journaled in suitable bearings 49 and 49', which are supported by the upright posts 50 and 50'. These posts 50 and 50' also serve to support the lower shaft 45, within journals 51 and 51'. The shaft 48 is extended slightly beyond the bearing posts 50' and has arranged upon the extension, a pulley wheel 52 whereby connection may be had with a driving belt 53.

When a forward drive is desired, a gear 54 fixedly mounted upon the shaft 48 and constantly meshing with the gear 46, drives the shaft 45 it being understood that the gear 46 is fixed on the shaft 45. The drum 44 has a clutch face 60 adjacent to the gear 47. The clutch face 60 is adapted to be engaged by a slidable clutch 61 which is mounted on the shaft 45 as clearly shown in Fig. 3. A bell crank 62 operates in an annular groove 63 in the periphery of the clutch 61, the bell crank lever being suitably supported so as to permit oscillation, upon an offset portion 65 formed upon a central supporting and bearing member 65', a link being connected with the remaining extremity of the lever 62, as designated at 64, for a purpose as will be subsequently apparent. By this arrangement, the clutch 61 may be moved into engagement with the face 60 and thus, the motion from the shaft 45 will be transmitted through the clutch to the winding drum 44 and provide the necessary forward drive. It will be observed in Figs. 1 and 3, that cables 55 and 56 are wound on the drum 44. The cable 55 passes under a sheave 57 which is suitably mounted on one of the cross bars 3 of the skid 1. The cable 55 passes upwardly and over a pulley 18 supported in the depending arms 17 of the member 16, and from thence around the pulley 58 on the cross bar 26'. The cable 55 then passes forwardly over the pulley 22 and is secured to the member 41 at 59. The cable 56 simply extends forwardly from the drum 44 and is secured to the member 41 at the gear 43.

For a reverse drive, I spline to the upper shaft 48, a second slidable clutch member 66, providing the same with an annular groove 66', which groove is engaged by a bell crank lever 67, constructed similarly to the lever 62. The bell crank is provided with an engaging link 63 which connects to an operating member 69. Keyed to the shaft 48 is a clutch member 68, adapted to engage with the slidable clutch 66. To provide means whereby the clutches 61 and 66 may be alternately engaged with the respective clutch faces, I secure the connecting link 63 to the lever 69 as stated, the lever 69 being pivoted intermediate its ends upon the supporting member 65'. Thus, by moving the lever in one direction, the clutch 61 may be engaged with its respective clutch face and, by moving it in an opposite direction, the clutch 61 will be disengaged and the clutch 66 engaged with its respective clutch face. It will be obvious, that the driving power must be indirectly transmitted to the gear 47 and to this end, I provide an elongated gear 71, this gear being constantly enmeshed with the gears 47 and 68', the latter, being formed on the clutch member 68. By the foregoing, it will be apparent that when the clutch 66 is engaged with its member 68, the drive to the winding drum 44 will be through the shaft 48 and the gears 68' and 71, to the gear 47 which is affixed to the drum. In order that the crane, as heretofore described, may be rotated and that the load handling means may be operated, I employ a novel arrangement of gearing, which shall be now described. Keyed to the shaft 48 and arranged upon the opposite side of the central supporting member 65' is a crown gear 72 which gear meshes with the elongated gear 32 hereinbefore mentioned, thus, providing means whereby the rack bar may be driven. Upon the lower shaft 45 and arranged upon the opposite side of the central supporting member to which the winding drum 44 is mounted, and keyed thereto, are beveled gears 73 and 73', the same having arranged upon their inner faces serrated portions 74 and 74', which are engageable with a slidable double faced clutch member 75, the same being operated by the bell crank lever 76, pivotally supported at 77, in a suitable bearing arranged adjacent the platform 4. The outer end of the bell crank arm 76 is provided with a hooked arm 78, this arm being receivable within the annular groove 79, arranged in the clutch 75, while the remaining end of the bell crank arm has pivotally connected therewith a link 80, whereby the operating lever 81 may be connected with the clutch and thus, affording means whereby the clutch may be alternately shifted into engagement with either of the faces 74 and 74', consequently, permitting a forward or reverse drive. Enmeshed with the gears 73 and 73', is a similar beveled gear 82, mounted upon a shaft 82', which shaft, extends forwardly through a bearing member 83 and thence, through one of the transversely arranged members 43, to a position adjacent the periphery of the disk 8, and having arranged thereupon, a pinion 84, adapted to mesh with the teeth 9 of the disk 8, affording means whereby the same may be rotated. With a view toward providing means whereby the disk 8 may be supported in proper position during rotation thereof, I provide a plurality of idlers, generally numbered 85 and 85', which are mounted for rotation upon vertical supporting members 86, the latter set of idlers being provided with gear teeth in order to insure positive engagement with the underface of the disk 8, which is provided with the teeth 9, while the former, are merely cylindrical rolls securely held in engagement with the upper face of the disk.

Coming now to the operation of the device, and assuming that the operator desires to elevate the load, the lever 69 is so actuated as to throw the clutch 61 into engagement with the member 60, thus, causing a forward drive. As will be obvious, the cables 55 and 56 are oppositely wound upon the drum and consequently, permit the forward and backward swinging of the load handling member 41. As the winding drum is rotated forwardly, the cable 55 will be wound upon the drum 44, while the cable 56 will be unwound therefrom and thereby, cause the load handling member to be moved forwardly as it is elevated. During this operation, it will be noted, that the crown gear 72 will be subsequently driven, which will cause the gear 28 to be rotated, through the medium of the universally joined shafts 29 and 31. The clutch member 34 is then moved into engagement with elongated gear 32 and consequently, causing the rotation of the gear 25, thus, causing the rack bar 37 to be moved upwardly to the desired elevation whereupon, the load may be released from the member 41. Should the operator desire to move the load to one side the lever 81 is moved so as to bring the clutch 75 into engagement with one of the serrated faces 74 or 74', which in turn, will cause the shaft 82' to be rotated in a predetermined direction, and, by means of the gear 84 will impart rotary motion to the disk 8, and serve as efficient means to shift the crane to the desired position. The load being released and it then being desired to return the various elements to their normal position, whereby a subsequent load may be elevated, the clutch 34 is disengaged from its receiving member 33 and the clutch 61 is disengaged from its respective face 60 and the clutch 66 is engaged with the face 68 whereupon the drum will be rotated in a reverse direction and consequently, permit the unwinding of the cable 55 and the winding of the cable 56, which, will cause the load handling member 41 to be lowered to a proper position for subsequent usage. The crane may be then moved into the desired position, by actuating the lever 81 so as to disengage the clutch with the face previously engaged and shifted into engagement with the remaining face, hence, causing the shaft 82 to be rotated in a reverse direction, which reverse movement will be transmitted to the disk 8 and permit the crane to be moved.

It is of course apparent, that should the device be used for unloading purposes, it is merely necessary that the load handling member 41 be elevated to receive the load and lowered to a position whereupon the load may be removed.

From the foregoing, it will be apparent to workers in the art that I have provided a loading and unloading device not only simple in construction, but one, wherein the load may be efficiently handled in conveying the same to its proper destination; further, that the construction is free from intricate arrangements, thereby reducing the cost of manufacturing constructions of this character.

Other modes of applying the principle of my invention may be employed instead of the one explained, change being made as regards the mechanism herein disclosed, provided the means stated by any of the following claims or the equivalent of such stated means, be employed.

I, therefore, particularly point out and distinctly claim as my invention.

1. In a device of the class described, the combination of a plurality of standards, a block having flanges formed thereon, said block extending between said standards, said flanges engaging the upper ends of said standards, thus supporting said block to reinforce the upper ends of said standards, arms connected to said block at the upper ends of said standards, parallel depending arms projecting downwardly from said block, a pulley carried by said depending arms, said pulley being carried between the standards, a lifting means carried by said arms, an operating cable connected to said means and extending around said pulley, said pulley guiding said cable between said standards, a lug extending upwardly from said block, and a brace member connected to said lug, thus reinforcing said standards and said first mentioned arms.

2. In a device of the class described, the combination of a plurality of standards, a block having flanges formed thereon, said block extending between said standards, said flanges engaging the upper ends of said standards, thus supporting said block to reinforce the upper ends of said standards, arms connected to said block at the upper ends of said standards, parallel depending arms projecting downwardly from said block, a pulley carried by said depending arms, said pulley being carried between said standards, a lifting means carried by said arms, and an operating cable connected to said means and extending around said pulley, said pulley guiding said cable between said standards.

In testimony whereof I affix my signature in presence of two witnesses.

CHARLES MESENBRINK.

Witnesses:
J. L. BORDEWICK,
C. E. BENJAMIN.